May 28, 1946.  L. SAMEL  2,400,955
BEVERAGE CONTAINER AND DISPENSER
Filed Aug. 14, 1943  3 Sheets-Sheet 1
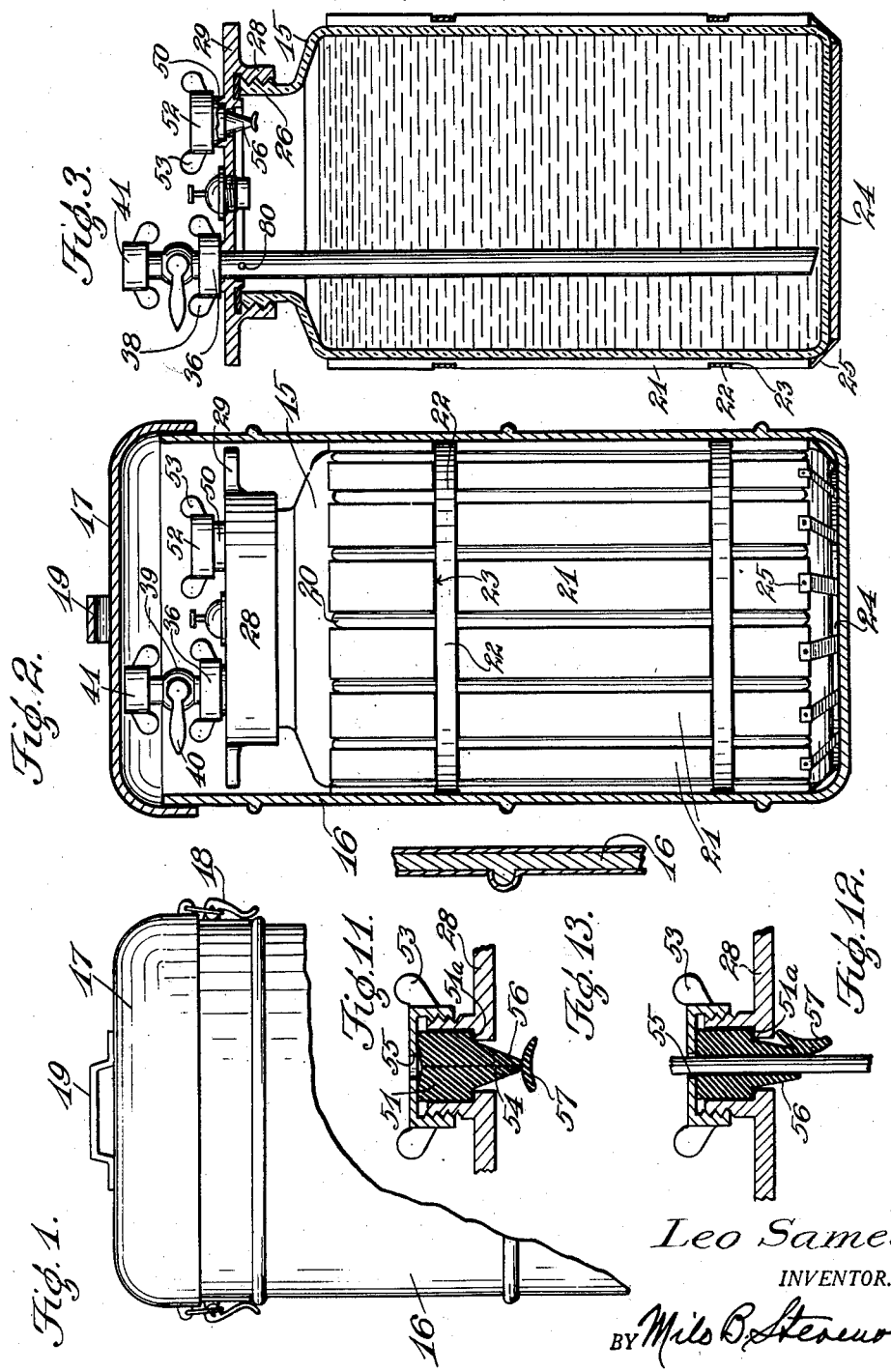
Leo Samel
INVENTOR.
Attorneys.

May 28, 1946.  L. SAMEL  2,400,955
BEVERAGE CONTAINER AND DISPENSER
Filed Aug. 14, 1943  3 Sheets-Sheet 2
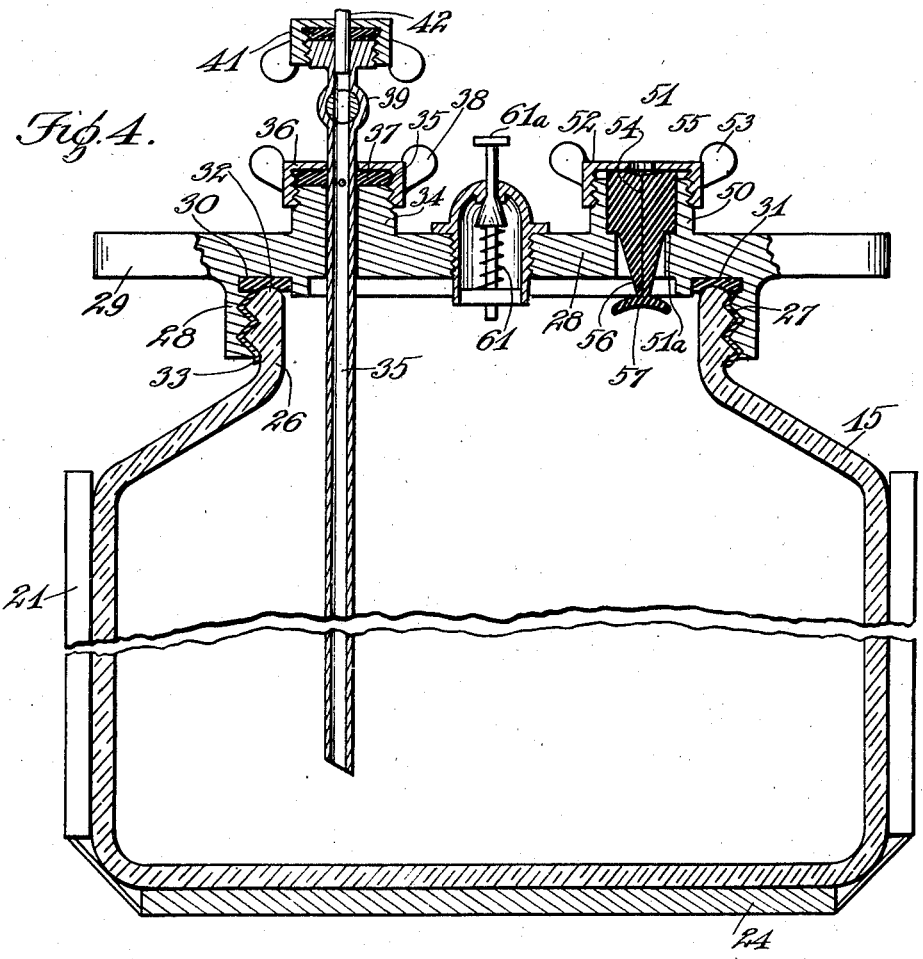
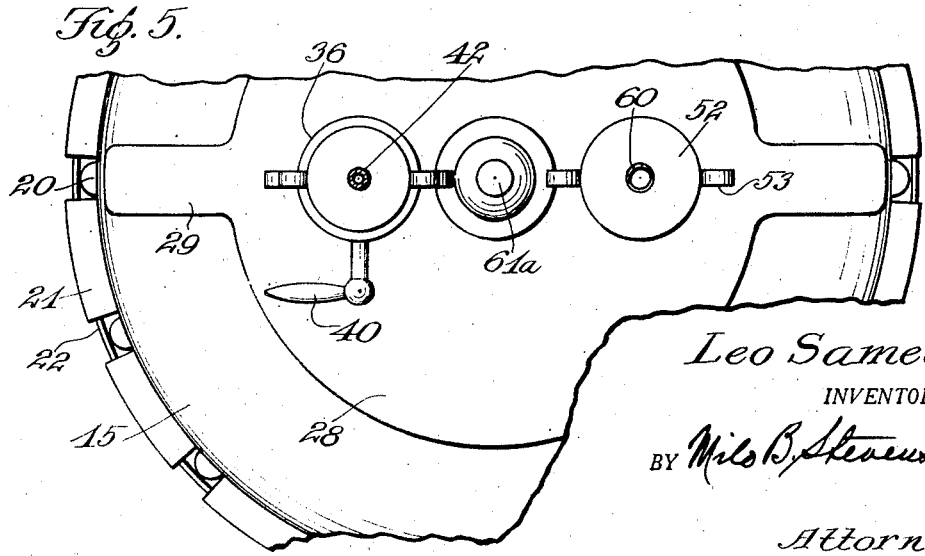
Leo Samel
INVENTOR.
Attorneys.

May 28, 1946. L. SAMEL 2,400,955
BEVERAGE CONTAINER AND DISPENSER
Filed Aug. 14, 1943 3 Sheets-Sheet 3
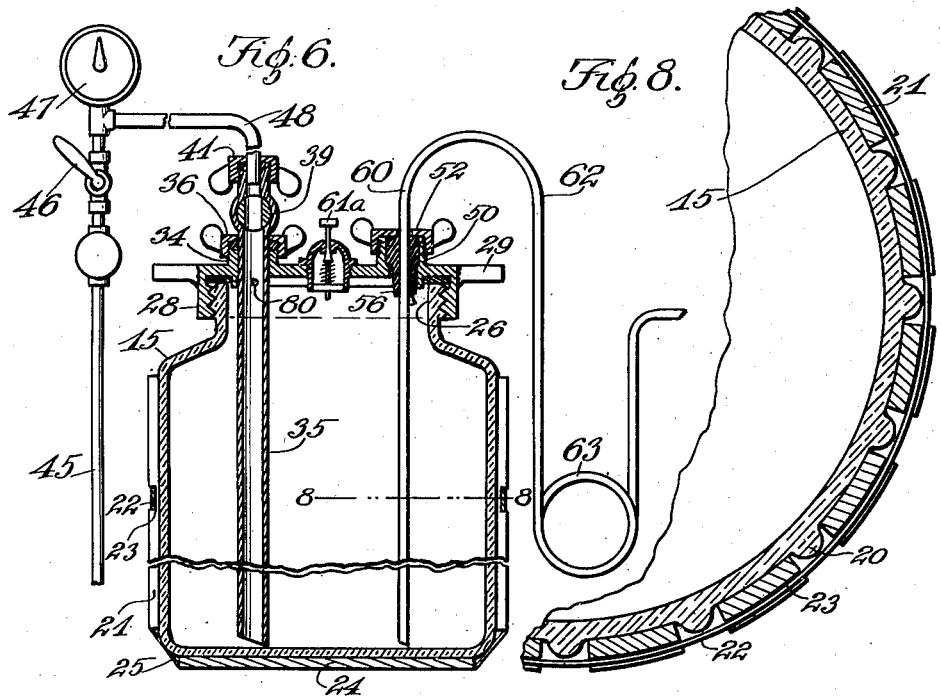
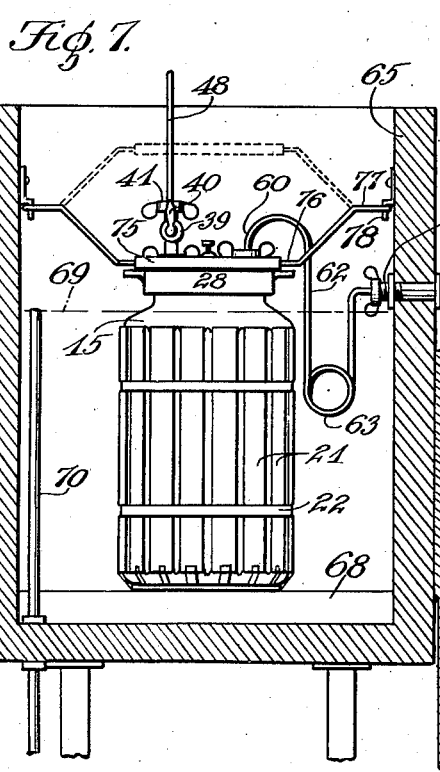
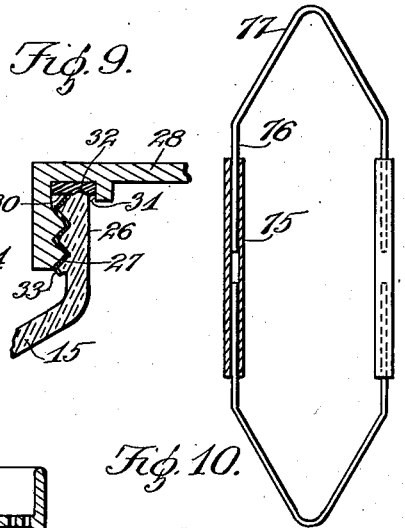
Leo Samel
INVENTOR.
BY Milo B. Stevens & Co.
Attorneys.

Patented May 28, 1946

2,400,955

UNITED STATES PATENT OFFICE 2,400,955

BEVERAGE CONTAINER AND DISPENSER

Leo Samel, Harvey, Ill.

Application August 14, 1943, Serial No. 498,657

3 Claims. (Cl. 225—15)

My invention relates to beer or other carbonated beverage containers and dispensers, and more particularly to that class of containers—commonly termed as barrels, kegs or drums—in which the beer or other beverage is delivered to the place where it is sold or dispensed.

Under present conditions the maintenance of beer barrels or kegs is far from sanitary, and the handling or keeping of the beer during delivery or at the place of sale is often prejudicial to its condition or taste, not to speak of dispensing problems which are troublesome, cause waste and delay service.

Wooden barrels are generally used for storing and delivering beer. When empty, they are usually allowed to stand—with bungholes open—in a basement, yard, or alley adjacent to the place where the beer is sold. The beer residue in the barrels ferments, attracting flies or other insects entering through the bungholes, such insects lodging in cracks, crevices or worm holes in the barrel wall and contaminating the interior of the barrel. This condition is aggravated by the entry of dust or other foreign matter through the bungholes, as the barrels are left to stand for some time before they are returned to the brewery. The subsequent washing and pitching of the barrel interior is often insufficient to dislodge foreign particles or the bodies of insects lodged in or adhering to the interior of the barrels. Flies and other insects often enter the barrels through open bungholes after washing. In transporting barrels to places of sale, the vibration and handling of the barrels sometimes loosen or dislodge insect bodies, pitch particles or other foreign matter, and allow them to be drawn into the customer's glass when the beer is dispensed. Obviously, the inaccessibility of the barrel interior for inspection of sanitation and complete pitching makes its condition dubious at all times, and renders it difficult to avoid impurities in and the contamination of the beer contents. Also, the lack of visibility into the barrel renders the amount of its contents speculative.

In the further consideration of wooden beer barrels, it is found that the staves shrink after the barrel stands empty, necessitating the driving of the hoops closer to keep the barrel tight. The barrel thus becomes smaller, reducing its rated capacity. Metal drums overcome some of the deficiencies of wooden barrels, but are costly at the outset and have been found to impart a metallic taste and clouding effect on the beer. Pitching does not always cover or adhere to all of the inner surface; also, it often breaks off from impact, and is subjected to unsanitary conditions because of open bungholes. It is thus apparent that no beer container exists at the present time which can be depended upon to maintain the beer in a clean or sanitary condition and preserve its brewed-in flavor or taste.

The dispensing of the beer under present conditions involves the maintenance of special devices to lead and control the beer, imposing special duties on the bartender or servicing calls by brewery personnel, and professional cleaners, all in an effort to keep the equipment in a clean and operation condition and help control the dispensing of the beer against contamination and agitation and to preserve its taste, which at best is a hit and miss method resulting in loss of trade. The care required of the bartender keeps him unduy occupied; and special dispensing apparatus is often detrimental to the taste of the beer by causing waste through agitation due to execssive foaming which results from the liberation of carbon dioxide ($CO_2$). Also, the beer is often led over a considerable course, allowing scum or residue to accumulate and impair or turn the taste of the beer.

In nearly all cases the barrel is kept either exposed to atmospheric temperature or is precooled. In either case the beverage in the barrel is warmer than the approved drawing temperature. Moreover, in leading the beer from the barrel to the dispensing apparatus it becomes even warmer. Therefore, when the beer is dispensed rapidly, it is often insufficiently cooled to make it satisfactory. It is consequently an object of the present invention to cool the entire contents at the dispensing zone, enabling the beverage to be drawn at a uniform temperature.

It is a further object of the invention to provide a combination beer container and dispenser which allows full visibility of its interior to facilitate the thorough and easy cleaning thereof and enable the amount or level of its contents to be determined or checked at a glance.

A still further object of the invention is to provide a container which is easily portable, is amply protected against breakage or injury during transit or handling, and is insulated to retain the temperature of its contents.

Another object of the invention is to provide a container which may be deposited in a conventional cooler and quickly connected to the pressure and dispensing faucet.

A further object of the invention is to provide the novel container with simple and automatic means for barring the entrance of insects or foreign matter after the container has been emptied and is awaiting return to the brewery, and to eliminate the costly equipment for pitching plus the cost of labor and material.

With the above objects in view and any others which may suggest themselves from the description to follow, a better understanding of the invention may be had by reference to the accompanying drawings, in which Fig. 1 is a partial elevation of the novel container as packed for shipment from the brewery;

Fig. 2 is an elevation of the container showing its packing case in section;

Fig. 3 is a vertical section of the filled container;

Fig. 4 is an enlarged section of the container, partly broken away;

Fig. 5 is a partial plan view of Fig. 4;

Fig. 6 is a view similar to Fig. 3, partly broken away, and showing the container connected for dispensing purposes;

Fig. 7 is an elevation of the container, showing it mounted in a beer cooler at the dispensing site;

Fig. 8 is an enlarged section on the line 8—8 of Fig. 6, showing a reinforcing means;

Fig. 9 is an enlarged section of a closing seal at the top of the container;

Fig. 10 is a plan view of a retaining device shown in the top of Fig. 7, partly in section;

Fig. 11 is a section of an outlet seal for the container in the normal position;

Fig. 12 is a similar view, showing the seal opened; and

Fig. 13 is an enlarged section of a portion of the packing case for the container.

Primarily, it is my purpose to make a sanitary container for beer or other carbonated beverages, and specific reference to the drawings shows such a container at 15, the same being in the form of a glass bottle or drum. Obviously, such a container can be kept thoroughly clean on the inside, does not in any way affect the condition or taste of its contents, and permits the view thereof to ascertain the quantity of its contents and whether any foreign matter, sediment or other impurities have found their way into the container during filling.

While glass is an ideal material for the container from the viewpoint of sanitation and economy, it must be suitably protected to save the container from breakage or other injury. For this purpose, Figs. 1, 2 and 13 show that I have provided a jacket 16 as a packing case, such jacket receiving a tightly fitted cover 17, which is secured to the case 16 by hand clamps 18. As indicated in Fig. 13, the walls of the packing case are of plywood or metal with a suitable insulation or plastic content; and the cover 17 has a handle 19. Thus, the container 15 is fully jacketed for ordinary handling or rolling from the delivery wagon to the place of use, and the packing case also helps to retain the original temperature of the contents. In addition, the container is reinforced by being made with a series of integral vertical ribs 20 between which a series of wooden slats 21 is laid. As indicated in Fig. 5, the slats 21 are of a thickness to project beyond the container ribs 20; and the overall girth of the slats is such that they will make a sliding fit with the container into the packing case jacket 16. The series of slats 21 is secured to the container in two or more places by encircling bands 22 of metal, these seating in notches 23 made in the slats whereby to lie well within the outer surfaces thereof. The container is additionally reinforced by a wooden bottom 24 which is secured to the slats 21 by a series of metal straps 25. It is thus apparent that the glass container is amply protected against shock or rough handling on its way from or to the brewery.

The mouth 26 of the container is of a smaller diameter than the body thereof and externally threaded as indicated at 27 to receive a massive circular cap 28 having extensions 29 on opposite sides to facilitate the rotation of the cap to apply it to or remove it from the container. A rubber washer 30 is seated in an annular bottom groove 31 made in the cap and serves as a seal in respect to the beaded upper edge 32 of the container mouth. An additional seal is provided in the form of a parchment or waxpaper ring 33 inserted between the threads of the container mouth and the cap, insuring a hermetical sealing of the container against passage of liquid, gas, air or the effect of pressure, and preventing friction between the metal and the glass.

The cap 28 usually remains mounted on the container, except when its removal is required for the thorough cleaning of the container or some repair or adjustment. It is not necessary to remove the cap for the purpose of filling the container, such service being rendered by way of a filler neck 34. This element serves for the snug passage of a vertical tube 35 into the container, a seal with the tube being procured by threading the filler neck as indicated at 35 to receive a screw cap 36 in which a compressible packing 37 is contained, the cap 36 having projecting wings 38 for manual control. The tube 35 extends upwardly to form a valve 39 operable by a handle 40, beyond which the tube receives a coupling 41 similar to the packing cap 36 to connect the tube to a pipe 42 which supplies the beer at the brewery. The beer is thus fed into the container by pressure until it has reached a desired level—as indicated in Fig. 3—when the valve 39 is closed, the coupling 41 loosened, and the supply pipe 42 removed. The container is now ready to be packed for delivery.

When the filled container reaches the place of sale, it is coupled to an air or gas pressure supply unit 45 in order that the beer may be dispensed under pressure. As indicated in Fig. 6, the supply unit 45 has its own shut-off 46 and gage 47; and the unit is extended with a pipe 48 which is applicable to the coupling 41 in the manner of the filler pipe 42 in order to connect the air pressure unit to the container tube 35.

The dispensing of the beer is by way of an outlet neck 50 rising from the cap 28. This neck receives a gum rubber insert 51 seating on an internal ledge 51a of the neck 50 and rising slightly above the latter. The neck is threaded to receive a cap 52 having projecting wings 53 for manual control, the cap being designed to bear on the insert 51 when screwed down and seal the same in the neck 50. The insert 51 has a vertical split 54 leading to an opening 55 in the center of the cap 52. As indicated in Figs. 11 and 12, the insert 51 converges downwardly as shown at 56, but is split at the bottom. One section of the bottom is extended with a flap 57 overlying the split and forming a closure therefor, so that a seal is formed against the escape of any liquid, air or gas from the container.

The dispensing element of the container is in the form of a vertical tube 60 of an internal diameter sufficiently small to control the flow, such tube making a snug sliding fit through the insert 51 in the neck 50 as it advances in a downward direction to assume the position indicated in Fig. 6. This advance crowds the flap 57 aside as indicated in Fig. 12. However, when the tube 60 is raised out of the container, the flap automatically returns to again form a seal for the same. Incidentally, the flap 57 has a large, concave bottom surface to be more effective under pressure of gases in the container.

Since the filling of the container meets and builds up air pressure above the rising liquid, which is essential to prevent foaming, it becomes necessary to release some of the pressure to facilitate filling, for which purpose I have provided a small relief valve 61 in the center of the cap 28, the same being operable by depressing a finger plunger 61a.

It is customary to extend the dispensing tube 60 with a goose-neck 62 and intermediate coil 63 before the tube reaches the dispensing faucet 64. As shown in Fig. 7, this faucet is usually mounted in a beer cooling tank 65 having a frontal tray 66 for the glasses to be filled from the faucet 64. The container 15 is deposited in the cooler 65 in order to keep its contents cold, and the dispensing tube 60 is connected to the faucet 64 by means of a coupling 67. The container may rest on grid bars 68 in the bottom of the cooler, and the latter receives a filling of water to a suitable level, such as indicated by the line 69, with a drain pipe 70 as an overflow, the water being cooled by ice or mechanical refrigeration.

It may be assumed that the filled container 15 has sufficient weight to seat on the grid bars 68 as the beer is dispensed from time to time. However, as the contents of the container are drawn off, it will assume a tendency to float in the water contents of the cooler, and I have therefore devised an expedient to check this tendency. Figs. 7 and 10 show that the cap 28 is formed with a pair of parallel tubular receptacles 75 into which the legs 76 of arched spring brackets 77 enter slidably as indicated in Fig. 10. The outer ends of the brackets rise to be engaged by hooks 78 attached to the walls of the cooler 65, the brackets being held under tension. It is apparent that the brackets will prevent the container from rising after its contents are drawn off, the frame formed by the brackets also checking any tendencies on the part of the container to be swung sidewise. The legs of the brackets are of course adjustable telescopically in reference to the receptacles 75 to adapt the brackets to tanks of different widths; and the brackets are reversible to the position indicated by dotted lines in Fig. 7 in the event that a cooler shallower than the one shown is employed.

The position in which the filler tube 35 is used is indicated in Figs. 3 and 6, the tube terminating on the bottom of the container. In this position a side opening 80 in the upper portion of the tube opens on the space above the beer or other beverage in the container. Thus, when the filler tube is coupled to the air pressure feed at the dispensing site, the entry of air or gas above the liquid will balance the desired pressure imposed on the same, and suppress tendencies for turbulence and foaming, when drawing the beverage. Of course, where the working pressure becomes excessive due to improper regulation of pressure, a greater flow will occur at the faucet, causing excessive foaming as the beverage enters the glass. The relief valve 61 may be momentarily actuated to reduce the pressure while adjustment is made at the pressure valve, keeping the beverage under proper control.

Fig. 3 shows a container filled and ready for deposit into the cooler. However, when the container is still at the brewery and ready to be filled, the filler tube 35 is raised to appear as in Fig. 4, in which event the side opening 80 is closed by the packing 37. This permits the normal filling of the container to the desired level without the disturbance of the flow by the auxiliary outlet formed by the said side opening. In this case, too, the relief valve 61 may be actuated due to the internal atmospheric pressure in the top of the container, which would prevent the filling of the same to the required level. However, when the container has once been filled and its valve 39 closed, the tube 35 may be depressed to the position indicated in Figs. 3 and 6 to place the filled container in readiness for packing and delivery. Therefore, when the container is installed in the cooler, the side opening 80—which is now open—permits the air or gas supplied from the pressure pipe to enter the container as pressure to hold the $CO_2$ in solution and facilitate draining the beverage.

With the factors of sanitation, economy and visibility treated in foregoing sections, it is significant that the improved container—commonly of a 7½ gallon size—is a unit which is small enough to be handily coupled to the dispensing fittings in the cooler, so as to make a group capable of being served by the single cooler. The entire equipment is thus compactly installed and handy for access, inspection and service. The cooled maintenance of the beverage all the way to the faucet keeps the beverage at the desired temperature to the very point where it is discharged. This precludes the possibility of spoiling the condition or taste of the beverage from staleness or secondary fermentation through loss of $CO_2$, since it eliminates pipes or other carriers outside the cooling zone. The relatively small size of the improved container also leaves room in the cooler for other filled containers, which are thus kept properly cooled until needed and the quality of their contents preserved. Thus, the beverage is at its best at any time a container is coupled to the dispensing fittings, giving the patrons of the establishment a beverage on tap that retains its original quality until sold. In this manner the brewery and barkeeper can enjoy the economy and convenience of beverages delivered in bulk, while the sanitary maintenance of the equipment and desirable qualities of the beverage are gained, relieving the brewery and barkeeper of unpleasant tasks and uncertainty heretofore suffered despite all efforts to check and clean the barrels and dispensing equipment. The improved installation thus renders practicable the serving of beverages which satisfy the patron and encourages the sale of draught beer, thereby creating a profitable advantage for the barkeeper and brewer.

While I have described the improved beverage container and dispenser along specific lines, various minor changes or refinements may be made therein without departing from its principle, and I desire to consider such changes and refinements as coming within the scope and spirit of the appended claims.

I claim:

1. A beverage container comprising a vessel open at the top, a closure for the vessel having a packed and vertically-perforated bearing, and a filler tube slidable through the bearing into the container to a point near the bottom thereof, the tube having a side opening which is closed by the packing of the bearing when the tube is at the inception of its sliding descent for facility in filling the container with the beverage to a level spaced from the top of the container, the lowering of the tube exposing said side opening to the space in the top of the container to balance the pressure on the beverage when the tube receives a pressure medium.

2. The structure of claim 1, a valve carried by the filler tube above the packing, and a coupling forming the upper terminal of the tube for connecting the same with a supply of said medium.

3. The structure of claim 1, and a relief valve in said closure for excess gas pressure in the top of the container.

LEO SAMEL.